Feb. 7, 1961  N. B. CHRISTENSEN  2,970,614
CONTROL DEVICE FOR VEHICLE SUSPENSION
Filed March 3, 1958  2 Sheets-Sheet 1

INVENTOR.
NORMAN B. CHRISTENSEN
BY
ATTYS.

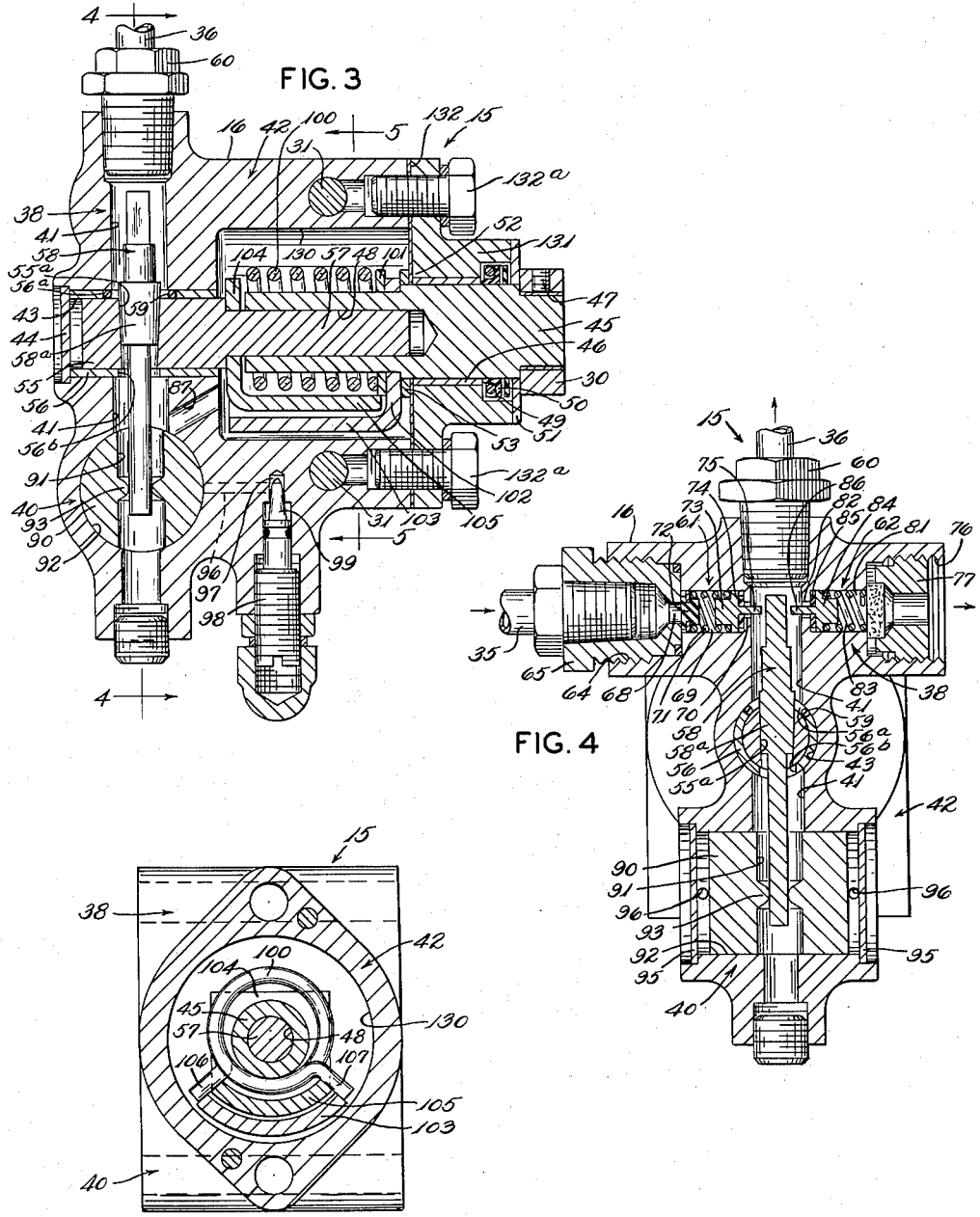

United States Patent Office 2,970,614
Patented Feb. 7, 1961

2,970,614

CONTROL DEVICE FOR VEHICLE SUSPENSION

Norman B. Christensen, North Olmsted, Ohio, assignor of one-half to Republic Manufacturing Co., Cleveland, Ohio, a corporation of Ohio, and one-half to The Firestone Tire & Rubber Company, Akron, Ohio, a corporation of Ohio Filed Mar. 3, 1958, Ser. No. 718,820

5 Claims. (Cl. 137—627.5)

The invention relates generally to suspension systems for vehicles and this application is a continuation-in-part of application Serial No. 616,994, filed October 19, 1956. More particularly, the invention relates to improvements in control devices for vehicles suspension systems whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air spring bellows interposed between the vehicle frame and the road or running gear, have been slow to achieve commercial success because they have not been provided with satisfactory means for controlling and regulating the air cushion within the air springs. Maintaining a constant average air cushion or air spring length under variable static load conditions, will provide a constant riding level for the vehicle.

A satisfactory control device for effectively regulating the riding level of a vehicle having an air spring suspension must be responsive to changing static load conditions. An increase in the load will compress the air spring. To restore the air spring to its initial position, additional air must be admitted into the air spring. A decrease in load will cause the air spring to extend or raise, and therefore, air must be exhausted or vented from within the air spring to restore it to its initial position.

A satisfactory control device should also incorporate therein a form of resilience or "lost motion" so that the device will not immediately react to supply or exhaust air, to or from an air spring, when there is a brief or transient alteration of the static load on the vehicle suspension system, such as would be attributable to bumps and holes in the road surface.

The requirement for some form of resilience or lost motion in the actuating components of the control device is related also to the problem of a predetermined period or time delay before the control device will react. Certain movements of a vehicle equipped with a pneumatic suspension system, such as a wide turn or a cloverleaf approach to a turnpike, cause the static load to shift. However, it is not desirable that the air springs compensate for the shifting load and therefore the control device should include a determinable time delay. This feature is referred to as "damping," the duration of which is preselected as determined by terrain, weight of the vehicle, the prevailing road condition, etc.

The operation of the control device also must not be influenced by the natural frequency of the vehicle suspension system which will probably be in the range of from 1 to 2 cycles per second.

Still further, a satisfactory control device must be unaffected by and remain operative under extremes of temperature, humidity and exposure to sand, dirt, grease, oil and water.

It is therefore an object of this invention to provide an improved control device for a vehicle air spring suspension, which regulates the supply and exhaust of air to and from the air springs, has cooperative lost motion and time delay or damping elements, and is operative under extremes of temperature, humidity and other environmental conditions.

Another object is to provide a control device torque transmission means, for actuating valves in the device in response to sustained relative movement between the vehicle road gear and frame, having torsional resilience in the form of a coiled spring.

These and other objects will be apparent in view of the following detailed description of the invention considered with the attached drawings.

In the drawings:

Fig. 3 is an enlarged sectional view of a control device having an improved torsion means in the valve actuating means;

Fig. 4 is a sectional view, taken substantially on line 4—4 of Fig. 3, looking through the control device toward the actuating rod, and Fig. 5 is a sectional view taken substantially on line 5—5 of Fig. 3.

A control device according to the invention is indicated generally at 15. The device 15 is intended to regulate a vehicle pneumatic suspension system including one or more expansible air spring bellows containing a cushion of air under pressure interposed between the road gear and frame of a vehicle. The control device includes a housing adapted to be fastened to the vehicle frame, valve means within the housing selectively controlling the supply of additional air to the bellows and the exhaust of air from the bellows, a control device actuating rod adapted to be fastened to the vehicle road gear exteriorly of the housing, a torque transmission means including a coiled spring having torsional resilience and connected to the actuating rod, a valve actuating means associated with the torque means, and a damping means for retarding movement of the valve actuating means.

Figure 1:
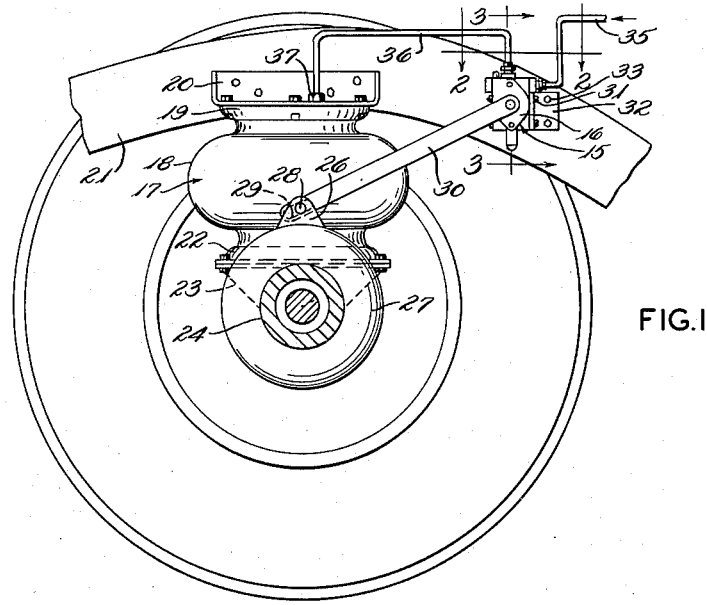
Fig. 1 is a vertical sectional view through a vehicle axle showing a portion of the vehicle equipped with an air spring bellows type pneumatic suspension system.
Figure 2:
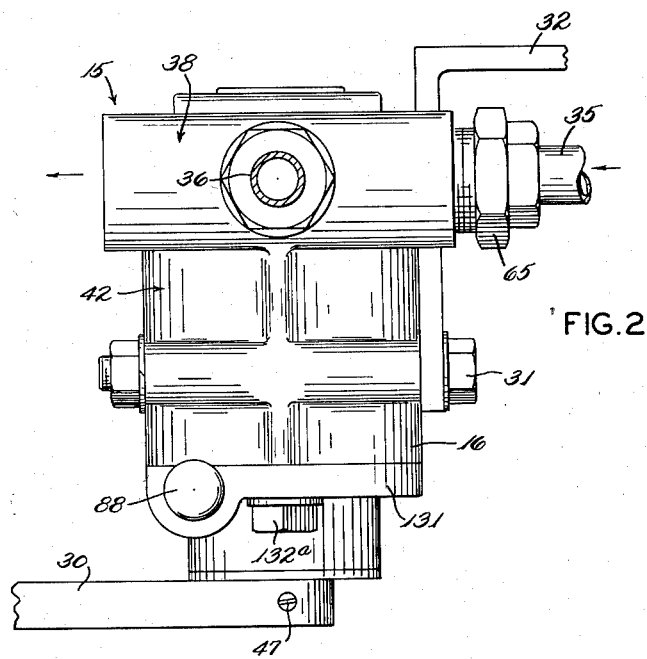
Fig. 2 is an enlarged top view of a control device and control or operating rod.

Referring to Figs. 1–3, the control device housing 16 may be located remotely and laterally of a conventional air spring bellows 17, constructed of multi-ply rubber and cord construction and having one or more convolutions 18. The upper end of the bellows is hermetically sealed by a suitable clamp ring 19 to the underside of a horizontal transverse member 20 constituting a portion of the vehicle frame. The transverse member is affixed at either end to longitudinal frame members 21. The lower end of the bellows is also hermetically sealed by a clamp ring 22 to the upper side of a bracket 23 on the axle housing 24 of the vehicle road gear. One mode of interposing an air spring or bellows between a vehicle frame and road gear has been shown and described by way of example. It will be understood, however, that the principles of the invention are applicable to the regulation of bellows interposed in other ways between the frame and road gear. Also, only one air spring is shown but it will be understood that the invention may be utilized with as many air springs as are required on a vehicle.

A stub flange or clevis 26, located for purposes of illustration atop the vehicle differential housing 27 though in any event at some point on the vehicle's road gear, has a bolt 28 therethrough. The bolt 28 extends through an elongated slot 29 formed in the lower end of a rigid control device actuating rod or bar 30. The slot 29 permits sliding movement of the control rod 30 as the distance between the road gear and vehicle frame changes, as described below.

The housing 16 is fastened by bolts 31 to a support bracket 32 extending transversely of a frame member 21 and fastened thereto by bolts 33. Air, from a source under pressure (not shown), is supplied to the housing 16 by suitable piping 35. The housing 16 is connected by suitable piping 36 to a bellows fitting 37 which extends through the frame member 20 into the interior of the bellows 17. The piping 36 is the conduit for supplying air to and exhausting air from the bellows, through operation of the control device 15, as described below.

As best shown in Figs. 3 and 4, the passage of air through the piping 35 and 36 is controlled by valve means located in a portion of the housing 16 indicated at 38. Below the valve portion 38, the housing has another portion indicated at 40 and containing the damping means. The interior of the damping portion 40 communicates with the interior of valve portion 38 through a vertical bore 41. Between the valve and damping portions the housing has a generally cylindrical body portion indicated at 42 extending laterally thereof.

Referring to the second sheet of the drawings, extending longitudinally through the body portion 42 is a large cylindrical bore 130. The inner end of bore 130 communicates with a smaller axially aligned bore 43 extending transversely of the vertical bore 41 and closed at the outer end by an expansion plug 44. The outer end of bore 130 is sealed by an annular closure plate 131 and oil seal 132, secured to an end face of the housing 16 as by bolts 132a. Journaled in the hub portion of the closure plate 131 is a rotatable plug shaft 45 having a peripheral bushing 46. The upper end of the control device actuating rod 30 is keyed as at 47 to the outer end of plug shaft 45. The inner end of the plug shaft 45 has a small diameter axial bore 48.

The outer end 49 of the hub bore of the closure plate 131 is adapted to seat a shaft oil seal 50. The outer end of the hub bore is closed by a washer 51 on the plug shaft 45, between the oil seal 50 and the actuating rod 30. At the inner end 52 of the hub bore, a similar washer 53 is placed on the plug shaft 45.

Journaled in the smaller longitudinal bore 43 is a rotatable actuating plug 55 having a peripheral bushing 56. The plug 55 has a shaft portion 57 extending into the larger bore 130 and rotatable in the axial bore 48 of the plug shaft 45. The plug 55 in effect divides the vertical bore 41 into two sections. The upper section of bore 41 communicates with the valve housing portion 38. The lower section of bore 41 communicates with the damping housing portion 40.

Extending through the actuating plug 55 and bushing 56, into both sections of the vertical bore 41, is a valve actuating member or bar 58 having a tapered medial portion 58a tightly seated in a tapered bore 55a. The upper surface of the plug bushing has a bar aperture 56a with a diameter (e.g. 9/16") greater than the diameter of the upper section of bore 41. The lower surface has an aperture 56b which is smaller than the diameter of the lower section of bore 41.

The upper section of bore 41 is sealed from the preferably fluid filled lower section, as described below, by an O-ring 59. The O-ring 59 is slightly larger (e.g. 5/8 inch O.D.) than the diameter of aperture 56a so that the O-ring will be under compression sufficient to effectively prevent passage of fluid around the bushing 56 into the upper bore section.

The upper end of bore 41 is closed by a threaded fitting 60 connected to the bellows piping 36. Below the fitting 60 are the preferably opposed valve means, indicated at 61 and 62, controlling the passage of air to and from the bellows through the fitting 60. The air supply valve means 61 includes a supply port 64 into which is threaded a fitting 65 connected to the supply piping 35. The inner end of port 64 has a small diameter axial orifice 68. The orifice 68 opens into a valve spring chamber 69 having another small diameter orifice 70 at the opposite end thereof opening into the vertical bore 41. Within the chamber 69 is a coiled compression spring 71. To limit loss of air pressure from the bellows in the event that the pressure in the supply piping 35 drops below that of the bellows, a check valve 72 normally closing orifice 68 is seated against the fitting 65 by the spring 71. At the inner end of the chamber 69, normally seated by the spring 71 so as to close the orifice 70, is a valve member 73 carrying an air impermeable disk or washer 74 and having a stem 75 projecting into the bore 41.

The air exhaust valve means 62 includes an exhaust port 76 which is fitted at its inner end with a filter screen plug 77. The exhaust port 76 opens into a valve spring chamber 81 having a small diameter orifice 82 at the opposite end thereof opening into the vertical bore 41. Within the chamber 81 is a coiled compression spring 83. At the inner end of the chamber 81, normally seated by the spring 83 so as to close the orifice 82, is a valve member 84 carrying an air impermeable disk or washer 85 and having a stem 86 projecting into the bore 41.

The valve members 73 and 84 with their closure disks 74 and 85, and the check valve 72, are suitably shaped to cover and close orifices 70 and 82, and 68, respectively, when seated by springs 71 or 83. They may be square, hexagonal, star shaped, round or any other shape that will permit the passage of air around the valve member when not seated.

The lower section of vertical bore 41 is filled with a fluid, such as an aircraft hydraulic oil (MIL-O-5606), by a diagonal passage 87 extending between the bore 41 and the large chamber 130. The large chamber 130 may be filled through an opening having a dustproof breather cap 88 (see Fig. 2) on top of the housing portion 42. Movement of the actuating bar 58, so as to selectively displace either stem 75 of valve 61 or stem 86 of valve 62, is retarded by damping means including a double-ended piston 90 having a transverse bore 91 communicating with bore 41.

The piston 90 is slidably fitted in a cross bore 92 in the housing portion 40. The medial portion of bore 91 has an annular ring 93 rounded for contact with the lower end of the actuating bar 58. Opening from each end of the cross bore 92, which is closed by expansion plugs 95, is a small fluid passage 96. The fluid passages 96 extend diagonally into housing portion 42 and converge preferably on different planes in a fluid well area 97. The rate of fluid flow through passages 96 and the well area 97, and thus the rate at which the piston 90 is displaced by the actuating bar 58, may be controlled by a screw 98 threaded into the housing portion 42 and having a tapered end 99 adjustable in the well area 97.

The valve actuating bar 58 is moved by the actuating rod 30 through a torque transmission means including the actuating plug 55, the plug shaft 45 and a preloaded coiled spring 100. The spring 100 extends longitudinally of bore 130 surrounding the telescoped portion of the shaft 45 and plug 55 and seating at the shaft end against a washer 101. Within bore 130, the shaft 45 has secured thereon transversely one arm 102 of a shaft lever whose other arm 103 is at right angles to the arm 102 and extends substantially parallel to the axis of shaft 45. The shaft portion 57 of the plug 55 has secured transversely thereon one arm 104 of a plug lever whose other arm 105 is at right angles to arm 104 and also extends substantially parallel to the axis of shaft 45, but inwardly of arm 103. The opposite ends 106 and 107 of the spring 100 engage opposite sides of the arm 103 of the shaft lever and arm 105 of the plug lever.

Rotation of the plug shaft 45 causes rotation of the lever arm 103 to wind up the spring 100 which urges the lever arms 105 to rotate the actuating plug 55. If the actuating plug 55 is restrained against movement, as by damping means in the housing portion 40, the spring 100 can yield to allow relative movement between the shaft 45 and plug 55.

The operation of the control device 15 is as follows:

Assume that the normal static load on the vehicle suspension requires that the air spring bellows 17 be inflated to a pressure of about 100 p.s.i. In this condition, the valves 61 and 62 are in a normal position such as shown in Fig. 4. This normal position is brought about because the valve springs 71 and 83 are so engineered as to seat the valve members 73 and 84 to close the orifices 70 and 82 against the pressure in vertical bore 41 communicating with the bellows piping.

As the static loading on the vehicle suspension system is increased, for example, by adding merchandise or passengers to the vehicle, the upper frame members 20 and 21 move downwardly toward the axle housing 24 causing the bellows 17 to contract. During this downward movement of the frame members, the bracket 32 and the control device 15 also move downwardly. Such downward movement of the control device causes the plug shaft 45 to be turned by the control rod 30, the lower end of which is slidably attached to the road gear by means of the bolt 28 and slot 29. That is, as the height of the bellows decreases, the rod 30 will cause the plug shaft 45 to be rotated.

When the height of a bellows decreases, for example, contracts due to increased load, the control rod will rotate the shaft 45 clockwise as viewed in Fig. 5. When rotation commences, the lever arm 103 will contact the spring end 106 and begin to further coil the spring. The spring end 107 is initially restrained from a synchronous movement by the lever arm 105 which cannot rotate without a corresponding displacement of the piston 90. The rate at which the piston 90 is displaced (to the right as viewed in Fig. 4) is determined by the setting of the tapered end 99 of the screw 98.

After the predeterminable period of delay or damping, and if the displacement of the shaft 45 is maintained, the torsional energy in the spring 100 applied through spring end 107 will have caused the lever arm 105 to be rotated to its original position in alignment with lever arm 103 and the actuating bar 58 will have been displaced laterally into contact with the valve stem 75.

When the valve member 73 is unseated, additional air will begin to flow from the supply piping 35, through the fitting 65 and then into bore 41 through orifice 70, and then out through the bellows fitting 60 and the bellows piping 36 to the bellows. This additional air must be under a greater pressure than the air already in the bellows and will extend the bellows to its normal position.

As the bellows extends, the frame members 21 move upwardly from the axle 24, reversing the torque on the actuating rod 30 and causing the plug shaft 45 to rotate in a counter-clockwise direction as viewed in Fig. 5. This reversal of torque is transmitted through the spring end 106 to the actuating plug 55 so that eventually the actuating bar 58 will be released from contact with the valve stem 75 and the spring 71, which has been compressed by the displacement of the valve member 73, will return the valve member and disk 74 to its seat against orifice 70, shutting off the flow of additional air to the bellows.

When the height of the bellows increases, the control rod 30 will rotate the shaft 45 counter-clockwise as viewed in Fig. 5. When the piston has moved laterally (to the left as viewed in Fig. 5) a distance sufficient to permit the spring end 106 to rotate the plug 55 and actuating bar 45 into alignment, the actuating bar 58 will unseat the valve member 84, exhaust air will flow from the bellows 17, through the bellows line 36 and fitting 60, into the bore 41 and then out through orifice 82 and plug 77 to the atmosphere.

As the bellows contracts, the torque on the actuating rod 30 is reversed and the actuating bar 58 will eventually be released from contact with the valve stem 86 and the spring 83, which had been compressed by displacement of the valve member 84, will return the valve member and disk 85 to its seat against orifice 82, shutting off the exhaust of air from the bellows.

When a vehicle equipped with a suspension system according to the invention is driven over rough roads with no change in the static loading, the vehicle wheels will move up and down over bumps and into holes in the road. However, the actuating bar 58 will not immediately react to actuate either of the valves 61 or 62 because of the torsional resilience provided by the spring 100 and the damping means 88. Thus, the admission of additional air to or the exhaust of air from the bellows 17 will not occur until a force is maintained in one direction for a predetermined period of time which can be controlled by the setting of the tapered end 99 of the screw 98. The time delay may be selected at any place within the preferred range of from 1 to 20 seconds.

A preferred embodiment of the invention has been shown together with certain changes and modifications thereto. It will be apparent that changes and modifications other than those specifically shown and described herein could be made without departing from the basic principles of the invention. Therefore, the annexed claims are intended to embody therein changes of such nature.

What is claimed is:

1. A control device comprising, a housing having a first bore, a second bore intersecting said first bore transversely thereof, opposed valve means at one end of said second bore, damping means at the other end of said second bore having a predetermined rate of movement, a plug rotatable in said first bore and extending transversely of said second bore, a rigid member in said second bore attached to said plug and having opposite ends adapted for engagement with said valve means and damping means, a shaft rotatable in said first bore and coaxially disposed to said plug, a first lever means attached to said shaft, a second lever means attached to said plug, and a coiled torsion spring resiliently connecting said levers whereby synchronous movement of said levers is limited by the rate of movement of said damping means upon actuation of said shaft.

2. A control device according to claim 1 wherein said first and second lever means each have a portion extending substantially parallel to the axis of said shaft and plug.

3. A control device according to claim 2 wherein said torsion spring has a helical portion surrounding said shaft with opposite ends engaged on opposite sides of the parallel portions of said lever means.

4. A control device according to claim 3, wherein the valve means comprises two oppositely acting normally inactive valves, one of which is actuated by movement of said first lever means in one direction and the other of which is actuated by movement of the first lever means in the opposite direction.

5. A control device comprising, a housing having a first bore, a second bore intersecting said first bore transversely thereof, a first lever in said first bore adapted to be oscillated by a force originating exteriorly of said housing, a second lever in said first bore freely pivoted about the pivot of said first lever and resiliently connected thereto, opposed valve means at one end of said second bore and communicating therewith, damping means at the other end of said second bore, and a rigid member in said second bore attached to said second lever to actuate said valve means upon movement thereof, sealing means dividing one end of said second bore from the other said damping means being connected to said rigid member to retard movement thereof and thereby prevent synchronous movement of the levers upon movement of the first lever at a rate greater than a predetermined rate.

References Cited in the file of this patent

UNITED STATES PATENTS

| | | |
|---|---|---|
| 1,655,729 | Jones | Jan. 10, 1928 |
| 2,607,611 | Allison | Aug. 19, 1952 |
| 2,670,201 | Rossman | Feb. 23, 1954 |

FOREIGN PATENTS

| | | |
|---|---|---|
| 754,386 | Great Britain | Aug. 8, 1956 |

Notice of Adverse Decision in Interference

In Interference No. 91,990 involving Patent No. 2,970,614, N. B. Christensen, Control device for vehicle suspension, final decision adverse to the patentee was rendered July 24, 1963, as to claims 1, 2, 3, and 4.

[*Official Gazette September 3, 1963.*]

Disclaimer 2,970,614.—*Norman B. Christensen*, North Olmsted, Ohio. CONTROL DEVICE FOR VEHICLE SUSPENSION. Patent dated Feb. 7, 1961. Disclaimer filed Sept. 9, 1963, by the inventor and the assignees, one-half to *Republic Manufacturing Co.* and one-half to *The Firestone Tire & Rubber Company.*

Hereby enter this disclaimer to claims 1, 2, 3 and 4 of said patent.
[*Official Gazette October 8, 1963.*]